(12) United States Patent
Imai (10) Patent No.: US 12,146,360 B2
(45) Date of Patent: Nov. 19, 2024

(54) SLIDING DOOR DRIVING DEVICE (71) Applicant: MITSUI KINZOKU ACT CORPORATION, Yokohama (JP)

(72) Inventor: Takuya Imai, Yokohama (JP)

(73) Assignee: MITSUI KINZOKU ACT CORPORATION (JP)

( * ) Notice: Subject to any disclaimer, the term of this patent is extended or adjusted under 35 U.S.C. 154(b) by 153 days.

(21) Appl. No.: 17/764,006

(22) PCT Filed: Nov. 20, 2020

(86) PCT No.: PCT/JP2020/043509
§ 371 (c)(1),
(2) Date: Mar. 25, 2022

(87) PCT Pub. No.: WO2021/106807
PCT Pub. Date: Jun. 3, 2021

(65) Prior Publication Data
US 2022/0341242 A1     Oct. 27, 2022

(30) Foreign Application Priority Data
Nov. 27, 2019   (JP) .................. 2019-214746

(51) Int. Cl.
| | |
|---|---|
| *H02P 6/28* | (2016.01) |
| *E05F 15/41* | (2015.01) |
| *E05F 15/659* | (2015.01) |
| *H02P 6/16* | (2016.01) |

(52) U.S. Cl.
CPC ............ *E05F 15/41* (2015.01); *E05F 15/659* (2015.01); *H02P 6/16* (2013.01); *H02P 6/28* (2016.02); *E05Y 2900/531* (2013.01)

(58) Field of Classification Search
CPC .............. E05F 15/41; H02P 6/16; H02P 6/28
See application file for complete search history.

(56) References Cited

U.S. PATENT DOCUMENTS

| | | | |
|---|---|---|---|
| 5,015,927 A | 5/1991 | Reichard | |
| 6,037,727 A * | 3/2000 | Kawanobe | ................. B60J 5/06 |
| | | | 318/446 |
| 6,425,206 B1 * | 7/2002 | Noda | ................... E05F 15/638 |
| | | | 49/506 |
| 7,746,012 B2 * | 6/2010 | Ubelein | ............... E05F 15/697 |
| | | | 318/443 |

(Continued)

FOREIGN PATENT DOCUMENTS

| | | |
|---|---|---|
| CN | 101729016 A | 6/2010 |
| CN | 101761284 A | 6/2010 |

(Continued)

*Primary Examiner* — Rina I Duda
(74) *Attorney, Agent, or Firm* — Foley & Lardner LLP (57) ABSTRACT

A sliding door driving device includes: a power source; a motor that outputs power to open and close the door; a motor driving circuit that connects the power source and the motor to each other; and a motor control device that controls the motor driving circuit. The motor control device includes an inverter that converts DC power supplied from the power source into AC power, and a shunt resistor disposed between the power source and the inverter. The position detection unit of the motor control device obtains the rotation angle of the motor based on the output of the shunt resistor.

10 Claims, 4 Drawing Sheets

(56) References Cited

U.S. PATENT DOCUMENTS

| | | | |
|---|---|---|---|
| 9,816,306 B2 * | 11/2017 | Ikeda | ................... G05B 9/02 |
| 2012/0286630 A1 | 11/2012 | Tomizawa et al. | |
| 2014/0366450 A1 | 12/2014 | Mizuma et al. | |
| 2016/0290028 A1 | 10/2016 | Ikeda et al. | |
| 2017/0260795 A1 | 9/2017 | Jergess | |
| 2018/0002969 A1 | 1/2018 | Endo et al. | |
| 2018/0305976 A1 | 10/2018 | Okachi et al. | |
| 2019/0093408 A1 * | 3/2019 | Kimura | ................ E05F 15/622 |
| 2020/0028446 A1 | 1/2020 | Ghaderi | |

FOREIGN PATENT DOCUMENTS

| | | |
|---|---|---|
| CN | 102780321 A | 11/2012 |
| CN | 104228708 A | 12/2014 |
| CN | 107882467 A | 4/2018 |
| CN | 108350723 A | 7/2018 |
| CN | 110392977 A | 10/2019 |
| JP | 2005-133449 A | 5/2005 |
| JP | 2005-146683 A | 6/2005 |
| JP | 2007-327220 A | 12/2007 |
| JP | 2009-068220 A | 4/2009 |
| JP | 2009-127336 A | 6/2009 |
| JP | 2014-181544 A | 9/2014 |
| JP | 2015-073361 A | 4/2015 |
| JP | 2016-211316 A | 12/2016 |
| JP | 2018-003426 A | 1/2018 |
| JP | 6333563 B2 | 5/2018 |
| WO | WO-2015/093514 A1 | 6/2015 |

* cited by examiner

SLIDING DOOR DRIVING DEVICE

CROSS-REFERENCE TO RELATED APPLICATIONS

The present application claims priority under 37 U.S.C. § 371 to International Patent Application No. PCT/JP2020/043509, filed Nov. 20, 2020, which claims priority to and the benefit of Japanese Patent Application No. 2019-214746, filed on Nov. 27, 2019. The contents of these applications are hereby incorporated by reference in their entireties.

TECHNICAL FIELD

The present invention relates to a sliding door driving device for opening and closing a sliding door of a vehicle.

BACKGROUND ART

Rear doors of one-box cars, wagons, and vans are often provided with sliding doors, and recently, the opening and closing operations have been automated. As a general configuration of a vehicle door opening/closing device that automatically opens and closes a sliding door, a rail member provided along a body side surface, a cable that opens and closes the door by being driven along the rail member, and a sliding door driving device for winding the cable are provided. In general, the sliding door driving device includes a motor as a power source, a deceleration mechanism for decelerating the rotation of the motor, and a rotary drum mechanism rotated by the deceleration mechanism to wind and unwind the cable. In many cases, the sliding door driving device is provided with a switch for manually and automatically switching the opening and closing of the sliding door.

For example, it is described that, in a sliding door control device described in Patent Literature 1, a motor is provided with three Hall ICs as position sensors that detect a rotation position of a rotor, and the rotation angle of the motor (rotor) is detected by receiving signals from the three Hall ICs to open and close a sliding door.

CITATION LIST

Patent Literature

Patent Literature 1: JP-A-2014-181544

SUMMARY OF INVENTION

Technical Problem

However, the sliding door control device described in Patent Literature 1 requires three Hall ICs for detecting the rotation angle of the motor, and there is room for improvement in terms of manufacturing cost.

Meanwhile, even in a case where three Hall ICs are installed in the sliding door control device, when even one of the three Hall ICs fails, there is a disadvantage that the rotation angle of the motor cannot be detected, and a method for detecting the rotation angle of the motor by another method has been sought.

The present invention provides a sliding door driving device that can detect the rotation angle of the motor using a shunt resistor.

Solution to Problem

The present invention is a sliding door driving device including: a power source; a motor that outputs power to open and close the sliding door; a motor driving circuit that connects the power source and the motor to each other; and a control device configured to control the motor driving circuit, wherein the motor driving circuit includes: a power conversion device that converts DC power supplied from the power source into AC power, and a shunt resistor disposed between the power source and the power conversion device, and wherein the control device obtains a rotation angle of the motor based on an output of the shunt resistor.

Advantageous Effects of Invention

According to the present invention, by obtaining the rotation angle of the motor based on the output of the shunt resistor, it is possible to eliminate the need for a position sensor that outputs a signal that corresponds to the rotation position of the rotor. In a case where the position sensor is installed in the sliding door driving device, the rotation angle of the motor can be obtained by either the position sensor or the shunt resistor, and the resistance to failure is high.

DESCRIPTION OF EMBODIMENTS

Hereinafter, each embodiment of a sliding door driving device of the present invention will be described with reference to the drawings.

First Embodiment

Figure 1:
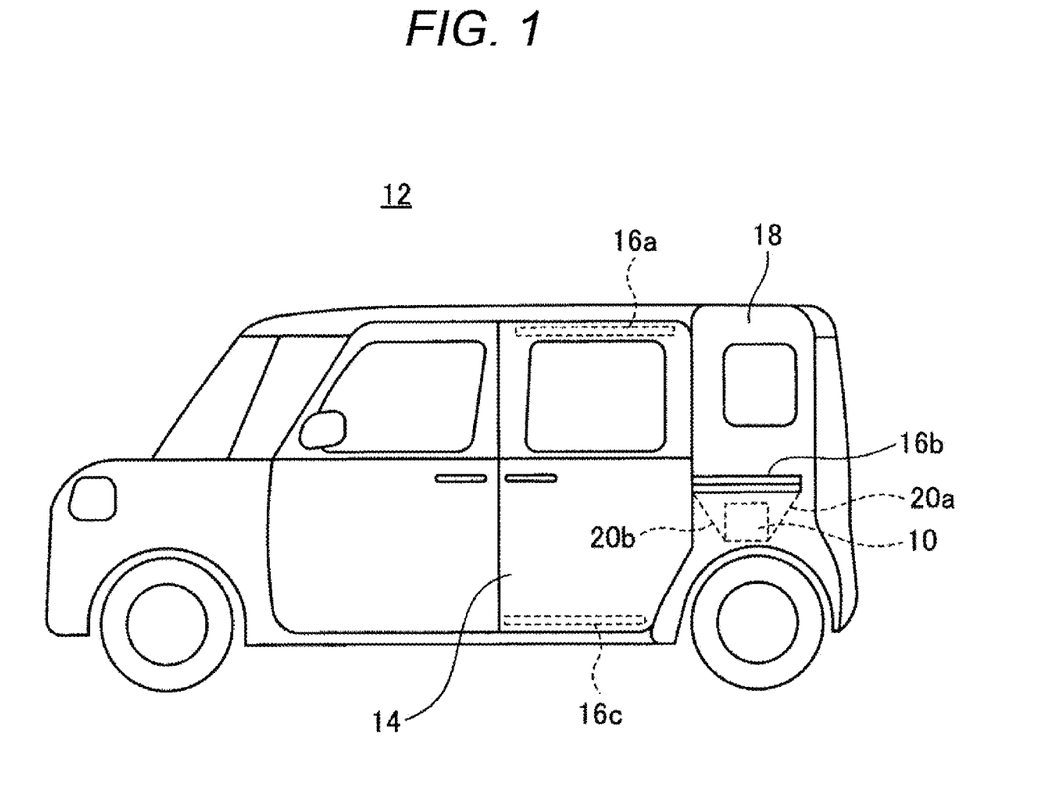
FIG. 1 is a side view of a vehicle in which a sliding door driving device according to an embodiment of the present invention is installed.

As illustrated in FIG. 1, a sliding door driving device 10 of the present embodiment is installed in the vehicle 12 and automatically opens and closes a rear door (sliding door) 14.

The door 14 is a sliding door, and is stably opened and closed while being supported at three points by an upper rail 16*a*, a center rail 16*b*, and a lower rail 16*c*. Among these, the center rail 16*b* is provided at a substantially intermediate height in a quarter panel 18.

Each end portion of an opening cable 20*a* and a closing cable 20*b* is fixed to a support frame provided on the door 14. The support frame includes a traveling roller that rolls within the center rail 16*b*. The opening cable 20*a* and the closing cable 20*b* are connected to the sliding door driving device 10. The door 14 can be opened and closed by winding and unwinding the opening cable 20*a* and the closing cable 20*b* by the sliding door driving device 10. The vehicle 12 is provided with holding means (not illustrated) that holds the door 14 at a fully open position or a fully closed position.

Figure 2:
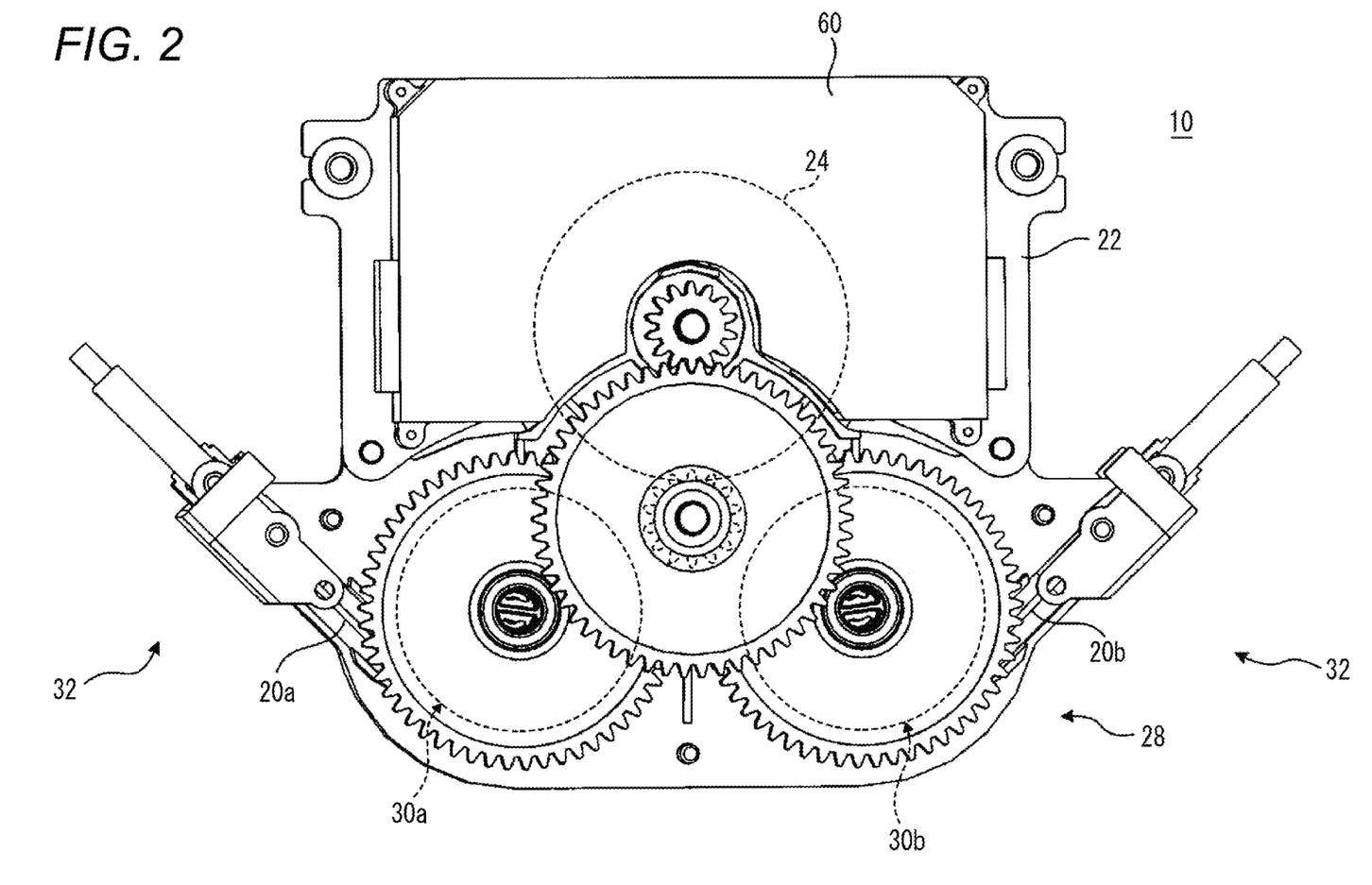
FIG. 2 is an explanatory view of the sliding door driving device of FIG. 1.

As illustrated in FIG. 2, the sliding door driving device 10 has a front-rear symmetrical structure, and includes the opening cable 20*a*, the closing cable 20*b*, a base plate 22, a motor 24, a sliding door control device 40, a deceleration mechanism 28, an opening drum mechanism 30*a*, a closing drum mechanism 30b, and a pair of front and rear path length adjusting mechanisms 32 in one unit.

In the sliding door driving device 10, by rotating the motor 24 in the forward direction, the rotation power of the motor 24 rotates the opening drum mechanism 30a via the deceleration mechanism 28 to wind the opening cable 20a, rotates the closing drum mechanism 30b to unwind the closing cable 20b, and accordingly, the door 14 is opened. Meanwhile, by rotating the motor 24 in the reverse direction, the rotation power of the motor 24 rotates the closing drum mechanism 30b via the deceleration mechanism 28 to wind the closing cable 20b, rotates the opening drum mechanism 30a to unwind the opening cable 20a, and accordingly, the door 14 is closed. The details of the structure of the sliding door driving device 10 will be omitted.

The vehicle 12 is configured such that, for example, a manual mode that prohibits the automatic opening and closing of the door 14 can be selected in the driver's seat. In the following description, the mode in which automatic opening and closing is allowed is referred to as an automatic opening/closing mode. The door 14 is provided with a door opening/closing switch 17 for the operator to instruct an opening and closing operations of the door 14. The door opening/closing switch 17 is configured with an opening switch 17a which is a switch for instructing the opening of the door 14 and a closing switch 17b which is a switch for instructing the closing of the door 14. In the automatic opening/closing mode, when the opening switch 17a or the closing switch 17b is pressed, at a timing of this pressing, a pulse signal for instructing the opening or closing of the door 14 is output to a switch control unit 61 and a motor driving unit 64 of the motor control device 60 which will be described later. Meanwhile, in the manual mode, even when the opening switch 17a or the closing switch 17b is pressed down, these operations are invalidated, and the user can manually open and close the door 14.

Figure 3:
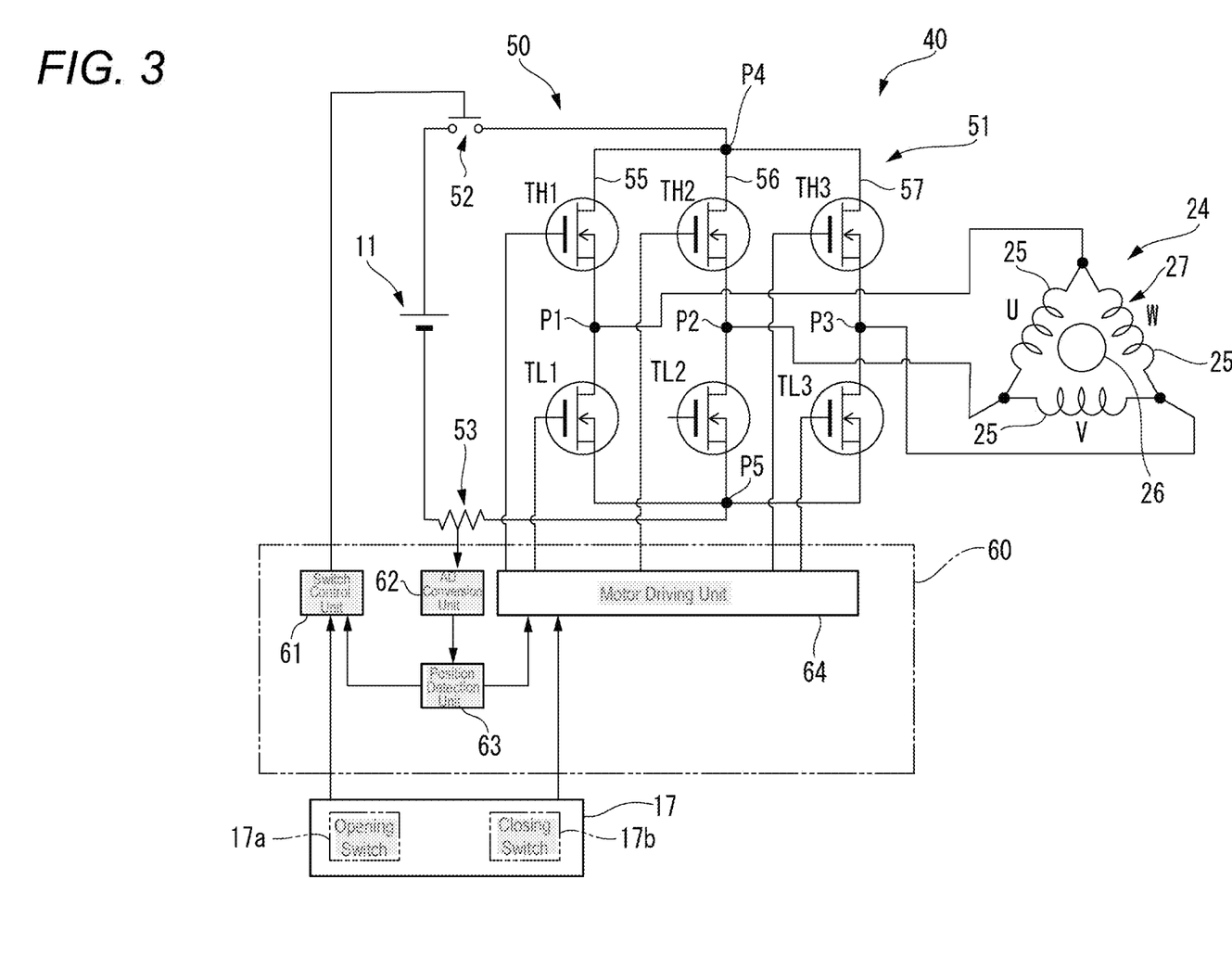
FIG. 3 is a block diagram of a motor control device of a sliding door driving device according to the first embodiment.

As illustrated in FIG. 3, the motor 24, which is a driving source of the sliding door driving device 10, is a three-phase brushless motor provided with U-phase, V-phase, and W-phase coils 25, and a rotor 26, on which a permanent magnet is disposed, is disposed with a predetermined gap facing the inner peripheral side of the stator 27 around which the delta-connected U-phase, V-phase, and W-phase coils 25 are wound.

(Configuration of Sliding Door Control Device)

FIG. 3 is a diagram illustrating a configuration of the sliding door control device 40 of the present embodiment.

The sliding door control device 40 includes a motor driving circuit 50 that connects the power source 11 and the motor 24 to each other, and the motor control device 60 that controls the motor driving circuit 50. The motor driving circuit 50 includes an inverter 51 that converts DC power from the power source 11 into AC power, a relay switch 52 that connects the positive electrode side of the power source 11 and the positive electrode side of the inverter 51 to each other, and a shunt resistor 53 that connects the negative electrode side of the power source 11 and the negative electrode side of the inverter 51 to each other. The power source 11 is, for example, a 12V battery that supplies electric power to auxiliary equipment of the vehicle 12.

The shunt resistor 53 may connect the positive electrode side of the power source 11 and the positive electrode side of the inverter 51 to each other, but the shunt resistor 53 connects the negative electrode side of the power source 11 and the negative electrode side of the inverter 51, and accordingly, the influence of noise can be suppressed, and the rotation angle of the motor 24 can be obtained more appropriately.

The inverter 51 includes: a first branch circuit 55 including a first high-side transistor TH1, a first low-side transistor TL1, and a first node P1 that connects the first high-side transistor TH1 and the first low-side transistor TL1 to each other in series; a second branch circuit 56 including a second high-side transistor TH2, a second low-side transistor TL2, and a second node P2 that connects the second high-side transistor TH2 and the second low-side transistor TL2 to each other in series; a third branch circuit 57 including a third high-side transistor TH3, a third low-side transistor TL3, and a third node P3 that connects the third high-side transistor TH3 and the third low-side transistor TL3 to each other in series; and a fourth node P4 and a fifth node P5 which connect the first branch circuit 55, the second branch circuit 56, and the third branch circuit 57 to each other in parallel.

Then, the first node P1, the second node P2, and the third node P3 are respectively connected to the delta-connected U-phase, V-phase, and W-phase coils 25. The fourth node P4 is connected to the positive electrode terminal of the power source 11 via the relay switch 52, and the fifth node P5 is connected to the negative electrode terminal of the power source 11 via the shunt resistor 53. The transistors TH1, TL1, TH2, TL2, TH3, and TL3 are configured with, for example, MOSFET, and is controlled to open and close by adjusting the gate voltage of the motor driving unit 64 of the motor control device 60.

Diodes that operate as return diodes are connected to each of the transistors TH1, TL1, TH2, TL2, TH3, and TL3 in parallel. The return diodes are provided to prevent damage to the transistors by returning (regenerating) the current flowing back from the motor 24 side to the power source 11 side when the transistors TH1, TL1, TH2, TL2, TH3, and TL3 are turned off.

Specifically, the motor control device 60 is mainly configured with a processor described later, and further contains a storage medium such as a Random Access Memory (RAM) required for the operation of the processor and a Read Only Memory (ROM) for storing various information. More specifically, the processor is an electric circuit in which circuit elements such as semiconductor elements are combined with each other. The motor control device 60 includes: a switch control unit 61 that controls the relay switch 52 as a functional block realized by the processor executing the program stored in the ROM; an AD conversion unit 62 that detects a voltage generated in the shunt resistor 53 by the current flowing through the inverter 51, and converts the detected voltage into a digital signal; a position detection unit 63 that detects the rotation angle of the motor 24 (rotor 26) by the output of the AD conversion unit 62; and a motor driving unit 64 that outputs a gate signal for switching the energization of the inverter 51 according to the rotation angle of the motor 24 detected by the position detection unit 63.

In the automatic opening/closing mode, the switch control unit 61 outputs a signal for turning on the relay switch 52 when the opening switch 17a or the closing switch 17b is pressed, and controls so that the electric power from the power source 11 is supplied to the motor 24 via the inverter 51. In the manual mode, even in a case where the moving speed of the door 14 exceeds a predetermined speed, as will be described later, there is a case where a signal for turning on the relay switch 52 is output.

The position detection unit 63 monitors the output of the shunt resistor 53 and performs a conversion process such as a predetermined filtering process or Fourier transform, and accordingly, the rotation angle of the motor 24 is obtained, and the moving direction and moving speed of the motor 24, that is, the moving direction and the moving speed of the door 14 are obtained. In other words, the position detection unit 63 obtains the rotation angle of the motor 24 based on the output of the shunt resistor 53.

The motor driving unit 64 generates and outputs a driving signal for alternately switching each of the transistors TH1, TL1, TH2, TL2, TH3, and TL3 of the inverter 51 based on a signal input from the door opening/closing switch 17, a rotation angle of the motor 24 input from the position detection unit 63, and a signal related to the moving direction and the moving speed of the door 14. Accordingly, the motor driving circuit 50 performs the control to apply an energization pattern of a supply voltage for alternately energizing the U-phase, V-phase, and W-phase coils 25 to the U-phase, V-phase, and W-phase coils 25, and to drive the motor 24 such that the door 14 moves at a predetermined speed in the opening direction or the closing direction.

Each control of the specific door 14 of the sliding door driving device 10 configured in this manner will be described below.

(Motor Start Control)

When the opening switch 17*a* or the closing switch 17*b* is pressed in the automatic opening/closing mode, the motor 24 is started. In the motor 24 in which the position sensor is not installed, the motor driving circuit 50 cannot obtain the rotation angle (position of the rotor 26) of the motor 24. Therefore, when the motor 24 is started, the motor driving circuit 50 applies the energization pattern of the supply voltage for alternately energizing the U-phase, V-phase, and W-phase coils 25 to the U-phase, V-phase, and W-phase coils 25. Accordingly, the motor 24 starts to move in any of the energization patterns. The current value at this time is preferably smaller than the normal current value. When the motor 24 starts to move, the rectangular wave control is performed with respect to the motor 24 according to a program so that the speed reaches a predetermined speed.

(Motor Drive Control 1)

In the steady operation of the motor 24 in which the rotating force of the start is obtained by the rectangular wave control, the output of the shunt resistor 53 is monitored, the assuming rotation angle of the permanent magnet of the rotor 26 is predicted, and the driving power that corresponds to the rotation angle of the motor 24 is controlled so as to be the optimum sine wave power.

(Motor Drive Control 2)

In the steady operation of the motor 24 in which the rotating force of the start is obtained by the rectangular wave control, the output of the shunt resistor 53 is monitored, the assuming rotation angle of the permanent magnet of the rotor 26 is predicted, and the driving power that corresponds to the rotation angle of the motor 24 is vector-controlled so as to be the optimum sine wave power.

In the motor drive control 1 and the motor drive control 2, by performing the sine wave control, it is possible to improve the power efficiency compared to the rectangular wave control, and to improve the noise reduction performance (low vibration). By performing the vector control in the motor drive control 2, the power efficiency can be further improved compared to the sine wave control of the motor drive control 1. In the motor drive control 1 and the motor drive control 2, the torque-rotation speed characteristic generated in the motor 24 may be changed by accelerating (advanced angle) or decelerating (retarded angle) the power application with respect to the assuming rotation angle of the permanent magnet of the rotor 26. Accordingly, the motor 24 can be operated at high torque and low rotation speed or at low torque and high rotation speed.

In the motor drive control 1 and the motor drive control 2, the door speed may be calculated by monitoring the output of the shunt resistor 53, and the duty ratio applied to the motor 24 may be changed so as to reach the set speed.

(Pinch Detection)

The output of the shunt resistor 53 is monitored, the fluctuation of the output of the shunt resistor 53 according to a sudden change in the door speed is obtained, and in a case where the fluctuation reaches the pinching threshold value, it is determined that foreign matter is pinched.

Hereinafter, the brake control for generating a holding force on the door 14 will be described. The brake control is used for giving an operation load to the door 14, for example, in a case where the door 14 is held at an intermediate position between the open position and the closed position in the automatic opening/closing mode, or in the manual mode, when the motor 24 is not driven. When the door 14 is held at the intermediate position between the open position and the closed position in the automatic opening/closing mode, the door 14 can be opened and closed unintentionally in a vehicle parked on a slope. Meanwhile, in the manual mode, when the operation speed of the door 14 is extremely fast, there is a concern that the vehicle body is damaged or the opening/closing sound becomes loud. In such a case, by applying an operation load to the door 14, the moving speed of the door 14 can be suppressed. The speed of the door 14 is determined by the output of the shunt resistor 53.

(First Brake Control)

When the motor 24 is not driven, in a case where the output of the shunt resistor 53 reaches a first predetermined value, the power source 11 is charged in a closed state of the relay switch 52. When the motor 24 is not driven, in a case where the energy generated by the external force applied to the motor 24 exceeds a predetermined amount, the relay switch 52 is turned on, and in a case where the generated energy exceeds the power source voltage, the power source 11 absorbs the generated energy, and accordingly, the operation load can be generated on the motor 24. In other words, in the first brake control, a braking force can be applied by the regenerative brake to the movement of the door 14 when the motor 24 is not driven.

(Second Brake Control)

When the motor 24 is not driven, in a case where the output of the shunt resistor 53 reaches a second predetermined value larger than the first predetermined value, the relay switch 52 is in an open state, and the first high-side transistors TH1, and the second high-side transistor TH2, and the third high-side transistor TH3 are in the open state, and at least one of the first low-side transistor TL1, the second low-side transistor TL2, and the third low-side transistor TL3 is in the closed state. In the second brake control, a closed circuit is formed in the motor driving circuit 50, and a braking force is generated in the motor 24. Accordingly, the braking force can be applied by the dynamic brake to the movement of the door 14 when the motor 24 is not driven.

Instead of a case where the first high-side transistor TH1, the second high-side transistor TH2, and the third high-side transistor TH3 are in the open state and at least one of the first low-side transistor TL1, the second low-side transistor TL2, and the third low-side transistor TL3 is in the closed state, the first low-side transistor TL1, the second low-side transistor TL2, and the third low-side transistor TL3 may be in the open state and at least one of the first high-side transistor TH1, the second high-side transistor TH2, and the third high-side transistor TH3 may be in the closed state.

In the second brake control, as the output of the shunt resistor 53 increases, the number of transistors to be in the closed state is preferably increased. By increasing the number of transistors to be in the closed state, the number of closed circuits to be formed increases, and the braking force generated in the motor 24 also increases. Accordingly, the braking force can be appropriately applied according to the moving speed of the door 14. In order to increase the braking force generated in the motor 24, the duty ratio, which is the ratio at which the transistor is in the closed state, may be increased. In the second brake control, as the output of the shunt resistor 53 increases, the duty ratio of the transistor to be in the closed state increases, and accordingly, the braking force can be appropriately applied according to the moving speed of the door 14.

(Third Brake Control)

When the motor is not driven, in a case where the output of the shunt resistor 53 reaches a third predetermined value larger than the second predetermined value, the relay switch 52 is in a closed state and the motor 24 is driven in the direction of restricting the movement of the door 14. When the motor is not driven, by driving the motor 24 in the direction of restricting the movement of the door 14, it is possible to apply a strong braking force by the door 14 with respect to the movement of the door 14.

The holding force of the door 14 in the second brake control is higher than the holding force of the door 14 in the first brake control, and the holding force of the door 14 in the third brake control is preferably higher than the holding force of the door 14 in the second brake control. By changing the holding force in the first brake control, the second brake control, and the third brake control in this manner, it is possible to appropriately apply the braking force according to the moving speed of the door 14. In a case where the door 14 is held at the intermediate position between the open position and the closed position in the automatic opening/closing mode, any of the first to third brake controls may be adopted regardless of the moving speed of the door 14.

Second Embodiment

Figure 4:
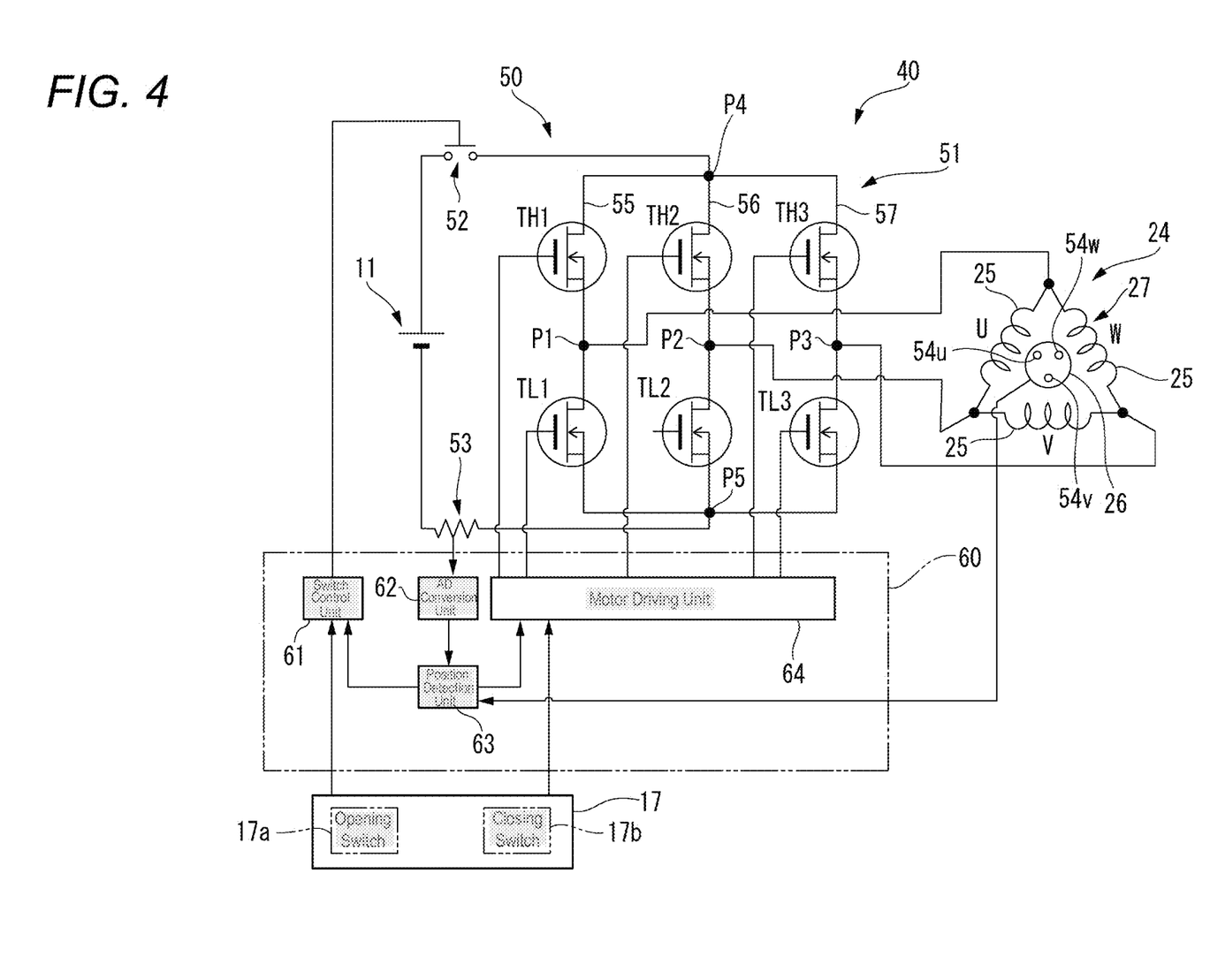
FIG. 4 is a block diagram of a motor control device of a sliding door driving device according to a second embodiment.

In the sliding door control device 40 of the first embodiment, a case where the rotation angle of the motor 24 is obtained based on the output of the shunt resistor 53 is exemplified, but the rotation angle of the motor may be obtained by the shunt resistor 53 and the position sensor. Hereinafter, in the sliding door control device 40 of the second embodiment, the motor 24 of the first embodiment further includes three Hall ICs 54u, 54v, and 54w as position sensors. Since the other configurations of the sliding door control device 40 are the same as those in the first embodiment, the same reference numerals will be given and the description thereof will be omitted.

In the motor 24, as illustrated in FIG. 4, three Hall ICs 54u, 54v, and 54w for detecting the rotation position of the rotor 26 are provided at positions of 120 degrees from each other on the rotor 26 or a rotating body that rotates integrally with the rotor 26. The three Hall ICs 54u, 54v, and 54w each output position sensor signals which are 120 degrees out of phase with each other to the position detection unit 63 when the motor 24 rotates.

The position detection unit 63 obtains the rotation speed of the motor 24, that is, the moving speed of the door 14, based on the interval of generation of the position sensor signals, and the rotation direction of the motor 24, that is, the moving direction of the door 14, based on the order of appearance of the position sensor signals. Therefore, the position detection unit 63 can obtain the rotation angle of the motor 24 (rotor 26) by both the shunt resistor 53 and the Hall ICs 54u, 54v, and 54w. The position detection unit 63 can obtain the position of the door 14 by integrating the switching of the position sensor signals starting from the time when the door 14 reaches the reference position (for example, the fully closed position).

Each control of the specific door 14 of the sliding door driving device 10 configured in this manner will be specifically described, but the first to third brake controls are the same as those in the first embodiment, and thus the description thereof will be omitted.

(Motor Start Control)

When the opening switch 17a or the closing switch 17b is pressed in the automatic opening/closing mode, the motor 24 is started. At this time, the rotation angle of the motor 24 is detected by the Hall ICs 54u, 54v, and 54w, the energization pattern of the supply voltage that alternately energizes the U-phase, V-phase, and W-phase coils 25 according to the rotation angle of the motor 24 are applied to the U-phase, V-phase, and W-phase coils 25, and the rectangular wave control is performed with respect to the motor 24.

(Motor Drive Control 1)

In the steady operation of the motor 24 in which the rotating force of the start is obtained by the rectangular wave control, based on the output of the shunt resistor 53 or the position sensor signals of the Hall ICs 54u, 54v, and 54w, the assuming rotation angle of the permanent magnet of the rotor 26 is predicted, and the driving power that corresponds to the rotation angle of the motor 24 is controlled so as to be the optimum sine wave power.

(Motor Drive Control 2)

In the steady operation of the motor 24 in which the rotating force of the start is obtained by the rectangular wave control, based on the output of the shunt resistor 53 or the position sensor signals of the Hall ICs 54u, 54v, and 54w, the assuming rotation angle of the permanent magnet of the rotor 26 is predicted, and the driving power that corresponds to the rotation angle of the motor 24 is vector-controlled so as to be the optimum sine wave power.

In the motor drive control 1 and the motor drive control 2, by performing the sine wave control, it is possible to improve the power efficiency compared to the rectangular wave control, and to improve the noise reduction performance (low vibration). By performing the vector control in the motor drive control 2, the power efficiency can be further improved compared to the sine wave control of the motor drive control 1. In the motor drive control 1 and the motor drive control 2, the torque-rotation speed characteristic generated in the motor 24 may be changed by accelerating (advanced angle) or decelerating (retarded angle) the power application with respect to the assuming rotation angle of the permanent magnet of the rotor 26. Accordingly, the motor 24 can be operated at high torque and low rotation speed or at low torque and high rotation speed. Until the output of the shunt resistor 53 stabilizes, by obtaining the rotation angle of the motor 24 based on the position sensor signals of the Hall ICs 54u, 54v, and 54w, the rotation angle of the motor 24 can be obtained more appropriately.

In the motor drive control 1 and the motor drive control 2, the door position and the door speed are calculated based on the output of the shunt resistor 53 or the position sensor signals of the Hall ICs 54*u*, 54*v*, and 54*w*, and the duty ratio applied to the motor 24 may be changed so as to achieve the set speed that corresponds to the door position.

(Pinch Detection 1)

The output of the shunt resistor 53 is monitored, and in a case where the output of the shunt resistor 53 reaches the pinch threshold value that corresponds to the door position obtained from the position sensor signals of the Hall ICs 54*u*, 54*v*, and 54*w*, it is determined that foreign matter is pinched. By obtaining the fluctuation of the output of the shunt resistor 53 that corresponds to the sudden change in the door speed, it is possible to appropriately determine whether or not the foreign matter is pinched.

(Pinch Detection 2)

In a case where the output of the shunt resistor 53 reaches the pinch threshold value that corresponds to the door position obtained from the position sensor signals of the Hall ICs 54*u*, 54*v*, and 54*w*, it is determined that foreign matter is pinched. By obtaining the fluctuation of the position sensor signals of the Hall ICs 54*u*, 54*v*, and 54*w*, which corresponds to the sudden change in the door speed, it is possible to appropriately determine whether or not the foreign matter is pinched.

According to the sliding door driving device 10 of the present embodiment, the position detection unit 63 can obtain the rotation angle of the motor 24 by any of the Hall ICs 54*u*, 54*v*, and 54*w* and the shunt resistor 53, and thus, the resistance to failure is high.

Although various embodiments were described with reference to the drawings, it is needless to say that the present invention is not limited to such examples. It is obvious that those skilled in the art can come up with various examples of changes or modifications within the scope of the claims, which are also naturally understood that the examples of changes or modifications belong to the technical scope of the present invention. Each configuration element in the above-described embodiment may be combined in any manner within the range that does not depart from the gist of the invention.

For example, in the above-described embodiment, the Hall IC is exemplified as the position sensor, but another position sensor such as a rotary encoder may be used.

In this specification, at least the following contents are described. In parentheses, the corresponding configuration elements and the like in the above-described embodiments are illustrated, but are not limited thereto.

(1) A sliding door driving device (sliding door driving device 10) including: a power source (power source 11); a motor (motor 24) that outputs power to open and close the sliding door (door 14); a motor driving circuit (motor driving circuit 50) that connects the power source and the motor to each other; and a control device (motor control device 60) configured to control the motor driving circuit, in which the motor driving circuit includes: a power conversion device (inverter 51) that converts DC power supplied from the power source into AC power; and a shunt resistor (shunt resistor 53) disposed between the power source and the power conversion device, and the control device (position detection unit 63) obtains a rotation angle of the motor based on an output of the shunt resistor.

According to (1), by obtaining the rotation angle of the motor based on the output of the shunt resistor, it is possible to eliminate the need for the position sensor that outputs a signal that corresponds to the rotation position of the rotor. In a case where the position sensor is installed in the sliding door driving device, the rotation angle of the motor can be obtained by either the position sensor or the shunt resistor, and the resistance to failure is high.

(2) The sliding door driving device according to (1), in which the shunt resistor is disposed between a negative electrode side of the power source and a negative electrode side of the power conversion device.

According to (2), by disposing the shunt resistor between the negative electrode side of the power source and the negative electrode side of the power conversion device, the influence of noise can be suppressed and the rotation angle of the motor can be obtained more appropriately.

(3) The sliding door driving device according to (1), in which the control device controls the power conversion device according to the rotation angle of the motor obtained based on the output of the shunt resistor.

According to (3), by controlling the power conversion device according to the rotation angle of the motor obtained based on the output of the shunt resistor, it is possible to efficiently supply power to the motor and suppress vibration.

(4) The sliding door driving device according to (1), in which the control device determines whether or not foreign matter is pinched based on the output of the shunt resistor.

According to (4), by using the shunt resistor not only for obtaining the rotation angle of the motor but also for pinching foreign matter, the function can be expanded with a small number of components.

(5) The sliding door driving device according to (4), in which the motor further includes a position sensor that outputs a signal that corresponds to the rotation position of the rotor, and the control device is configured to obtain a position of the sliding door based on the output of the position sensor and determine whether or not foreign matter is pinched in a case where the output of the shunt resistor reaches a threshold value that corresponds to the position of the sliding door.

According to (5), by providing the position sensor in addition to the shunt resistor, the rotation angle of the motor can be obtained more accurately. In a case where the output of the shunt resistor reaches a threshold value that corresponds to the position of the sliding door, by determining whether or not foreign matter is pinched, it is possible to improve the accuracy of determining the pinching of foreign matter.

(6) The sliding door driving device according to any one of (1) to (5), in which the motor driving circuit includes a switch (relay switch 52) that is disposed between a positive electrode side of the power source and a positive electrode side of the power conversion device and is configured to open and close a power transmission path between the power source and the power conversion device, and the control device executes a first brake control for charging the power source in a closed state of the switch in a case where the output of the shunt resistor reaches a first predetermined value when the motor is not driven.

According to (6), a braking force can be applied by the regenerative brake to the movement of the sliding door when the motor is not driven.

(7) The sliding door driving device according to any one of (1) to (5), in which the motor driving circuit includes a switch (relay switch 52) that is disposed between a positive electrode side of the power source and a positive electrode side of the power conversion device and is configured to open and close a power transmission path between the power source and the power conversion device, the power conversion device includes: a first branch circuit (first branch circuit 55) including a first high-side transistor (first high-side transistor TH1), a first low-side transistor (first low-side transistor TL1), and a first node (first node P1) that connects the first high-side transistor and the first low-side transistor to each other in series; a second branch circuit (second branch circuit 56) including a second high-side transistor (second high-side transistor TH2), a second low-side transistor (second low-side transistor TL2), and a second node (second node P2) that connects the second high-side transistor and the second low-side transistor to each other in series; a third branch circuit (third branch circuit 57) including a third high-side transistor (third high-side transistor TH3), a third low-side transistor (third low-side transistor TL3), and a third node (third node P3) that connects the third high-side transistor and the third low-side transistor to each other in series; and a fourth node (fourth node P4) and a fifth node (fifth node P5) that connect the first branch circuit, the second branch circuit, and the third branch circuit to each other in parallel, the motor is a three-phase AC motor in which a stator coil is delta-connected to the first node, the second node, and the third node, the power source is connected to the fourth node and the fifth node, and the control device executes a second brake control including: setting the switch to be in an open state in a case where the output of the shunt resistor reaches a second predetermined value when the motor is not driven; and setting the first high-side transistor, the second high-side transistor, and the third high-side transistor to be in an open state, and setting at least one of the first low-side transistor, the second low-side transistor, and the third low-side transistor to be in a closed state, or setting the first low-side transistor, the second low-side transistor, and the third low-side transistor to be in an open state, and setting at least one of the first high-side transistor, the second high-side transistor, and the third high-side transistor to be in a closed state.

According to (7), a braking force can be applied by the dynamic brake to the movement of the sliding door when the motor is not driven.

(8) The sliding door driving device according to (7), in which in the second brake control, the control device increases the number of transistors to be in the closed state as the output of the shunt resistor increases.

According to (8), in the second brake control, as the output of the shunt resistor increases, the number of transistors to be in the closed state increases, and accordingly, the braking force can be appropriately applied according to the moving speed of the sliding door.

(9) The sliding door driving device according to (7), in which in the second brake control, the duty ratio of the transistor to be in the closed state increases as the output of the shunt resistor increases.

According to (9), in the second brake control, as the output of the shunt resistor increases, the duty ratio of the transistor to be in the closed state increases, and accordingly, the braking force can be appropriately applied according to the moving speed of the sliding door.

(10) The sliding door driving device according to any one of (1) to (5), in which the motor driving circuit includes a switch (relay switch 52) that is disposed between a positive electrode side of the power source and a positive electrode side of the power conversion device and is configured to open and close a power transmission path between the power source and the power conversion device, and the control device executes a third brake control for driving the motor in a direction of restricting movement of the sliding door in the closed state of the switch in a case where the output of the shunt resistor reaches a third predetermined value when the motor is not driven.

According to (10), a braking force can be applied by driving the motor in a direction of restricting the movement of the sliding door with respect to the movement of the sliding door when the motor is not driven.

(11) The sliding door driving device according to any one of (1) to (5), in which the motor driving circuit includes a switch that is disposed between a positive electrode side of the power source and a positive electrode side of the power conversion device and is configured to open and close a power transmission path between the power source and the power conversion device, the power conversion device includes: a first branch circuit (first branch circuit 55) including a first high-side transistor (first high-side transistor TH1), a first low-side transistor (first low-side transistor TL1), and a first node (first node P1) that connects the first high-side transistor and the first low-side transistor to each other in series; a second branch circuit (second branch circuit 56) including a second high-side transistor (second high-side transistor TH2), a second low-side transistor (second low-side transistor TL2), and a second node (second node P2) that connects the second high-side transistor and the second low-side transistor to each other in series; a third branch circuit (third branch circuit 57) including a third high-side transistor (third high-side transistor TH3), a third low-side transistor (third low-side transistor TL3), and a third node (third node P3) that connects the third high-side transistor and the third low-side transistor to each other in series; and a fourth node (fourth node P4) and a fifth node (fifth node P5) that connect the first branch circuit, the second branch circuit, and the third branch circuit to each other in parallel, the motor is a three-phase AC motor in which a stator coil is delta-connected to the first node, the second node, and the third node, the power source is connected to the fourth node and the fifth node, when the motor is not driven, the control device is configured to: in a case where the output of the shunt resistor reaches a first predetermined value, execute a first brake control for charging the power source in a closed state of the switch; in a case where the output of the shunt resistor reaches a second predetermined value, execute a second brake control including: setting the switch to be in an open state in a case where the output of the shunt resistor reaches a second predetermined value; and setting the first high-side transistor, the second high-side transistor, and the third high-side transistor to be in an open state, and setting at least one of the first low-side transistor, the second low-side transistor, and the third low-side transistor to be in a closed state, or setting the first low-side transistor, the second low-side transistor, and the third low-side transistor to be in an open state, and setting at least one of the first high-side transistor, the second high-side transistor, and the third high-side transistor to be in a closed state; and in a case where the output of the shunt resistor reaches a third predetermined value, execute a third brake control including driving the motor in a direction of restricting movement of the sliding door in a closed state of the switch, a holding force of the sliding door in the second brake control is higher than a holding force of the sliding door in the first brake control, and a holding force of the sliding door in the third brake control is higher than a holding force of the sliding door in the second brake control.

According to (11), by changing the holding force in the first brake control, the second brake control, and the third brake control, the braking force can be appropriately applied according to the moving speed of the sliding door.

REFERENCE SIGNS LIST

10 Sliding door driving device
11 Power source

14 Door
24 Motor
50 Motor driving circuit
51 Inverter (power conversion device)
52 Relay switch
53 Shunt resistor
54u, 54v, 54w Hall IC (position sensor)
55 First branch circuit
56 Second branch circuit
57 Third branch circuit
60 Motor control device
63 Position detection unit
TH1 First high-side transistor
TL1 First low-side transistor
TH2 Second high-side transistor
TL2 Second low-side transistor
TH3 Third high-side transistor
TL3 Third low-side transistor
P1 First node
P2 Second node
P3 Third node
P4 Fourth node
P5 Fifth node

The invention claimed is:

1. A sliding door driving device comprising:
a power source;
a motor configured to output power to open and close the sliding door;
a motor driving circuit that connects the power source and the motor to each other; and
a control device configured to control the motor driving circuit,
wherein the motor driving circuit comprises:
  a power conversion device configured to convert DC power supplied from the power source into AC power; and
  a shunt resistor disposed between the power source and the power conversion device, and
wherein the control device obtains a rotation angle of the motor based a voltage generated in the shunt resistor by the current flowing through the power conversion device,
wherein the motor driving circuit comprises a switch that is disposed between a positive electrode side of the power source and a positive electrode side of the power conversion device and is configured to open and close a power transmission path between the power source and the power conversion device,
wherein the power conversion device comprises:
  a first branch circuit comprising a first high-side transistor, a first low-side transistor, and a first node that connects the first high-side transistor and the first low-side transistor to each other in series;
  a second branch circuit comprising a second high-side transistor, a second low-side transistor, and a second node that connects the second high-side transistor and the second low-side transistor to each other in series;
  a third branch circuit comprising a third high-side transistor, a third low-side transistor, and a third node that connects the third high-side transistor and the third low-side transistor to each other in series; and
  a fourth node and a fifth node that connect the first branch circuit, the second branch circuit, and the third branch circuit to each other in parallel,
wherein the motor is a three-phase AC motor in which a stator coil is delta-connected to the first node, the second node, and the third node,
wherein the power source is connected to the fourth node and the fifth node, and
wherein the control device is configured to execute a first brake control comprising:
  setting the switch to be in an open state in a case where the output of the shunt resistor reaches a first predetermined value when the motor is not driven; and
  setting the first high-side transistor, the second high-side transistor, and the third high-side transistor to be in an open state, and setting at least one of the first low-side transistor, the second low-side transistor, and the third low-side transistor to be in a closed state, or
  setting the first low-side transistor, the second low-side transistor, and the third low-side transistor to be in an open state, and setting at least one of the first high-side transistor, the second high-side transistor, and the third high-side transistor to be in a closed state.

2. The sliding door driving device according to claim 1, wherein the shunt resistor is disposed between a negative electrode side of the power source and a negative electrode side of the power conversion device.

3. The sliding door driving device according to claim 1, wherein the control device is configured to control the power conversion device according to the rotation angle of the motor obtained based on the output of the shunt resistor.

4. The sliding door driving device according to claim 1, wherein the control device is configured to determine whether or not foreign matter is pinched based on the output of the shunt resistor.

5. The sliding door driving device according to claim 4, wherein the motor further comprises a position sensor configured to output a signal that corresponds to a rotation position of the rotor, and
wherein the control device is configured to:
  obtain a position of the sliding door based on the output of the position sensor; and
  determine whether or not foreign matter is pinched in a case where the output of the shunt resistor reaches a threshold value that corresponds to the position of the sliding door.

6. The sliding door driving device according to claim 1, wherein the motor driving circuit comprises a switch that is disposed between a positive electrode side of the power source and a positive electrode side of the power conversion device and is configured to open and close a power transmission path between the power source and the power conversion device, and
wherein the control device is configured to execute a first brake control comprising charging the power source in a closed state of the switch in a case where the output of the shunt resistor reaches a first predetermined value when the motor is not driven.

7. The sliding door driving device according to claim 1, wherein in the first brake control, the control device increases the number of transistors to be in the closed state as the output of the shunt resistor increases.

8. The sliding door driving device according to claim 1, wherein in the first brake control, a duty ratio of the transistor to be in the closed state increases as the output of the shunt resistor increases.

9. A sliding door driving device comprising:
a power source;
a motor configured to output power to open and close the sliding door;
a motor driving circuit that connects the power source and the motor to each other; and
a control device configured to control the motor driving circuit,
wherein the motor driving circuit comprises:
  a power conversion device configured to convert DC power supplied from the power source into AC power; and
  a shunt resistor disposed between the power source and the power conversion device, and
wherein the control device obtains a rotation angle of the motor based a voltage generated in the shunt resistor by the current flowing through the power conversion device,
wherein the motor driving circuit comprises a switch that is disposed between a positive electrode side of the power source and a positive electrode side of the power conversion device and is configured to open and close a power transmission path between the power source and the power conversion device, and
wherein the control device is configured to execute a first brake control for driving the motor in a direction of restricting movement of the sliding door in the closed state of the switch in a case where the output of the shunt resistor reaches a third predetermined value when the motor is not driven.

10. A sliding door driving device comprising:
a power source;
a motor configured to output power to open and close the sliding door;
a motor driving circuit that connects the power source and the motor to each other; and
a control device configured to control the motor driving circuit,
wherein the motor driving circuit comprises:
  a power conversion device configured to convert DC power supplied from the power source into AC power; and
  a shunt resistor disposed between the power source and the power conversion device, and
wherein the control device obtains a rotation angle of the motor based a voltage generated in the shunt resistor by the current flowing through the power conversion device,
wherein the motor driving circuit comprises a switch that is disposed between a positive electrode side of the power source and a positive electrode side of the power conversion device and is configured to open and close a power transmission path between the power source and the power conversion device, wherein the power conversion device comprises:
  a first branch circuit comprising a first high-side transistor, a first low-side transistor, and a first node that connects the first high-side transistor and the first low-side transistor to each other in series;
  a second branch circuit comprising a second high-side transistor, a second low-side transistor, and a second node that connects the second high-side transistor and the second low-side transistor to each other in series;
  a third branch circuit comprising a third high-side transistor, a third low-side transistor, and a third node that connects the third high-side transistor and the third low-side transistor to each other in series; and
  a fourth node and a fifth node that connect the first branch circuit, the second branch circuit, and the third branch circuit to each other in parallel,
wherein the motor is a three-phase AC motor in which a stator coil is delta-connected to the first node, the second node, and the third node,
wherein the power source is connected to the fourth node and the fifth node,
wherein when the motor is not driven, the control device is configured to:
  in a case where the output of the shunt resistor reaches a first predetermined value, execute a first brake control comprising charging the power source in a closed state of the switch;
  in a case where the output of the shunt resistor reaches a second predetermined value, execute a second brake control comprising:
    setting the switch to be in an open state; and
    setting the first high-side transistor, the second high-side transistor, and the third high-side transistor to be in an open state, and setting at least one of the first low-side transistor, the second low-side transistor, and the third low-side transistor to be in a closed state, or
    setting the first low-side transistor, the second low-side transistor, and the third low-side transistor to be in an open state, and setting at least one of the first high-side transistor, the second high-side transistor, and the third high-side transistor to be in a closed state; and
  in a case where the output of the shunt resistor reaches a third predetermined value, execute a third brake control comprising driving the motor in a direction of restricting movement of the sliding door in a closed state of the switch,
wherein a holding force of the sliding door in the second brake control is higher than a holding force of the sliding door in the first brake control, and
wherein a holding force of the sliding door in the third brake control is higher than a holding force of the sliding door in the second brake control.

* * * * *